(12) United States Patent
Huang et al.

(10) Patent No.: US 11,263,794 B2
(45) Date of Patent: Mar. 1, 2022

(54) BINOCULAR SEE-THROUGH AR HEAD-MOUNTED DISPLAY DEVICE AND INFORMATION DISPLAYING METHOD THEREOF

(71) Applicant: CHENGDU IDEALSEE TECHNOLOGY CO., LTD., Sichuan (CN)

(72) Inventors: Qinhua Huang, Sichuan (CN); Haitao Song, Sichuan (CN); Xinyu Li, Sichuan (CN)

(73) Assignee: CHENGDU IDEALSEE TECHNOLOGY CO., LTD., Sichuan (CN)

( * ) Notice: Subject to any disclaimer, the term of this patent is extended or adjusted under 35 U.S.C. 154(b) by 1153 days.

(21) Appl. No.: 15/544,963

(22) PCT Filed: Aug. 7, 2015

(86) PCT No.: PCT/CN2015/086338
§ 371 (c)(1),
(2) Date: Jul. 20, 2017

(87) PCT Pub. No.: WO2016/115870
PCT Pub. Date: Jul. 28, 2016

(65) Prior Publication Data
US 2018/0025520 A1  Jan. 25, 2018

(30) Foreign Application Priority Data

Jan. 21, 2015  (CN) .......................... 201510029300.7

(51) Int. Cl.
*G06T 11/60* (2006.01)
*G02B 27/00* (2006.01)
(Continued)

(52) U.S. Cl.
CPC .......... *G06T 11/60* (2013.01); *G02B 27/0093* (2013.01); *G02B 27/017* (2013.01);
(Continued)

(58) Field of Classification Search
CPC .... G06T 11/60; H04N 13/383; H04N 13/344; G02B 27/0093; G02B 27/017;
(Continued)

(56) References Cited

U.S. PATENT DOCUMENTS

2006/0232665 A1* 10/2006 Schowengerdt ... G02B 27/0093
348/51
2012/0236031 A1* 9/2012 Haddick ................. G06F 3/011
345/633
(Continued)

FOREIGN PATENT DOCUMENTS

CN  103249352 A  8/2013
CN  103366381 A  10/2013
(Continued)

*Primary Examiner* — Jin Ge (57) ABSTRACT

Disclosed are a binocular see-through AR head-mounted device and an information displaying method thereof. Sight mapping relationship η is preset in the head-mounted device, human eye spatial sight information data of a user is tracked and calculated by a sight tracking system, virtual information that needs to be displayed is displayed on the left and right lines of sight of the human eyes on the basis of a binocular see-through AR head-mounted device virtual image imaging principle and a human eye binocular vision principle, thus implementing accurate overlap of the virtual information to the proximity of the position of the fixation point of the human eyes, allowing a high degree of integration of the virtual information with the environment, and implementing enhanced virtual reality in the true sense. The
(Continued)

present invention provides a simple solution, requires only the sight tracking system to complete the process, obviates the need for excessive hardware facilities, and is inexpensive.

20 Claims, 2 Drawing Sheets

(51) Int. Cl.
| | | |
|---|---|---|
| *H04N 13/383* | (2018.01) | |
| *G02B 27/01* | (2006.01) | |
| *H04N 13/344* | (2018.01) | |
| *G06F 3/01* | (2006.01) | |
| *G06K 9/00* | (2022.01) | |

(52) U.S. Cl.
CPC ......... *G02B 27/0172* (2013.01); *G06F 3/013* (2013.01); *G06K 9/00671* (2013.01); *H04N 13/344* (2018.05); *H04N 13/383* (2018.05); *G02B 2027/014* (2013.01); *G02B 2027/0127* (2013.01); *G02B 2027/0132* (2013.01)

(58) Field of Classification Search
CPC ........ G02B 27/0172; G02B 2027/0127; G02B 2027/0132; G02B 2027/014; G06F 3/013
USPC .......................................................... 345/633
See application file for complete search history.

(56) References Cited

U.S. PATENT DOCUMENTS

| | | | |
|---|---|---|---|
| 2012/0293407 | A1 | 11/2012 | Lee |
| 2013/0235169 | A1* | 9/2013 | Kato ...................... G02B 27/01 348/53 |
| 2013/0300634 | A1* | 11/2013 | White .................. G02B 27/017 345/7 |
| 2015/0237336 | A1* | 8/2015 | Sylvan .................. G02B 30/34 348/54 |

FOREIGN PATENT DOCUMENTS

| | | |
|---|---|---|
| CN | 103500446 A | 1/2014 |
| WO | 2014033306 A1 | 3/2014 |

* cited by examiner

BINOCULAR SEE-THROUGH AR HEAD-MOUNTED DISPLAY DEVICE AND INFORMATION DISPLAYING METHOD THEREOF

CROSS REFERENCE OF RELATED APPLICATION

This is a U.S. National Stage under 35 U.S.C 371 of the International Application PCT/CN2015/086338, filed Aug. 7, 2015, which claims priority under 35 U.S.C. 119(a-d) to CN 201510029300.7.

BACKGROUND OF THE PRESENT INVENTION

Field of Invention

The present invention relates to a head-mounted display technology field, and more particularly to a binocular see-through AR (Augmented Reality) head-mounted display device and an information display method of the binocular see-through AR head-mounted device.

Description of Related Arts

With the development of the wearable devices, the head-mounted display device becomes a research hot point of all the giant companies and known to people. The head-mounted display device is the best operational environment for the Augmented Reality Technique (abbreviated as AR) which is able to display the virtual information in real environment through the head-mounted device window. The conventional see-through AR head-mounted display device considers the correlation of X coordinate and Y coordinate of the target object and ignores the depth information of the target object when overlaps the AR information, which causes the virtual information drifting in front of the human eyes, a low degree of fusion with the surrounding environment and poor user experience. Besides, while the user vision switches between the target object and the overlapped AR information, the user needs to frequently adjust the focal length of the eyes to view the display clearly due to the depth of the target object and the overlapped information are different within the user range of vision, which will causes burden to the eyes and uncomfortable for the user to use for a long time.

The conventional technology enables adjusting the depth of the virtual image on the display, wherein mostly mechanical means are adopted to adjust the optical structure of the optical lens group for changing the image distance of the optical component to further adjust the depth of field of the virtual image. The head-mounted device which adopts the method has a big volume, a high cost and an uncontrollable accuracy.

SUMMARY OF THE PRESENT INVENTION

A target object of the present invention is to provide a binocular see-through AR head-mounted display device and an information display method for the binocular see-through AR head-mounted device, which enables automatic adjustment of the depth of field of the virtual information and completely fuses the virtual information with the environment.

Another target object of the present invention is to provide an information display method for the binocular see-through AR head-mounted device. A mapping relationship $\eta$ of the line-of-sight is pre-set inside the head-mounted device, $\eta$ is the mapping relationship between the line-of-sight information data in eye-centered coordinate and the coordinates of the left and right pixel pair of the image display source on the head-mounted device. The information display method comprises steps of:

capturing the line-of-sight information data in eye-centered coordinate when a user stares at a target object;

obtaining the coordinates of the left and right pixel pair of the target object according to $\eta$ and the line-of-sight information data in eye-centered coordinate of the target object; and displaying a information source image of virtual information to be displayed onto an image display source on left and right respectively, wherein the coordinates of the left and right pixel pair of the target object is a reference position.

Optimally, displaying the information source image of virtual information to be displayed onto the image display source on left and right respectively, wherein the coordinates of the left and right pixel pair of the target object is a reference position, comprises steps of:

displaying the information source image of virtual information to be displayed onto the image display source on left and right respectively, wherein the coordinates of the left and right pixel pair of the target object is a center; or displaying the information source image of virtual information to be displayed onto the image display source on left and right respectively, which is at a shifted position of the coordinates of the left and right pixel pair of the target object;

optimally, when the user initially use the head-mounted device and/or while each use of the head-mounted device, $\eta$ will be modified;

optimally, the modification of $\eta$ comprises steps of controlling the image display source to display each pixel pair of a left and a right modified bitmap in sequence to project a virtual bitmap corresponding to each pixel pair in front of the user eyes;

capturing the line-of-sight information data in eye-centered coordinate while the user stares at every virtual bitmap to obtain the line-of-sight information data in eye-centered coordinate corresponding to the virtual bitmap;

modifying $\eta$ by using the line-of-sight information data in eye-centered coordinate corresponding to all the virtual bitmap.

Optimally, the left and the right modified bitmap is a bitmap with r rows and s columns, wherein r and s are positive integers which are greater than 1 and less than 10.

Optimally, modifying $\eta$ comprises steps of:

controlling the image display source to display multiple sets of a left and a right modified images in sequence to project a virtual overlap image corresponding to every set of the modified image in front of the user eyes;

capturing the line-of-sight information data in eye-centered coordinate while the user stares at every virtual bitmap to obtain the line-of-sight information data in eye-centered coordinate corresponding to the virtual bitmap;

modifying $\eta$ by using the line-of-sight information data in eye-centered coordinate corresponding to all of the virtual overlap images.

Optimally, the method comprises an offline constructing η which comprises steps of:

capturing multiple sets of the left and the right bitmaps;

testing one of a test user in multiple test users by using all the left and right bitmaps in sequence to calculate test data of the test user;

constructing η according to the test data of all the test users;

wherein, testing the test user by using all the left and the right bitmap to calculate the test data of the test user comprises steps of:

controlling the image display source to display each pixel pair of the left and the right bitmap in sequence for each set of the left and the right bitmap of the multiple sets of the left and the right bitmaps in sequence to project the virtual bitmap corresponding to the coordinates of the pixel pair in front of the test user eyes;

capturing the line-of-sight information data in eye-centered coordinate while the user stares at the virtual bitmap to obtain the line-of-sight information data in eye-centered coordinate corresponding to the pixel pair;

determining the test data of the test user and building a mapping relationship between the test data comprising the coordinates of each pixel pair of all the left and the right bitmap and the corresponding line-of-sight information data in eye-centered coordinate.

Optimally, capturing the multiple sets of the left and the right bitmaps comprise steps of:

capturing an initial left and right bitmap;

obtaining the multiple sets of the left and the right bitmaps according to the initial left and right bitmap and shorten a center to center distance of the calculated multiple sets of the left and the right bitmaps in sequence.

Optimally, η fulfils:

$$(ELnm_1, ERnm_2) \Leftrightarrow f(SLnm_1, SRnm_2);$$

wherein $(ELnm_1, ERnm_2)$ is the line-of-sight information data in eye-centered coordinate; $(SLnm_1, SRnm_2)$ are the coordinates of the left and the right pixel pair of the image display source on the head-mounted device, wherein $n \in [1, N]$, $m_1 \in [1, M]$, $m_2 \in [1, M]$; N and M are a vertical resolution and a horizontal resolution of a left and a right image display source of the head-mounted device respectively; $f$ is a fitting function.

A binocular see-through AR head-mounted display device comprises an image display source, a line-of-sight tracking system and a data processing module, wherein the data processing module stores a line-of-sight mapping relationship η; η is a mapping relationship between line-of-sight information data in eye-centered coordinate and coordinates of a left and a right pixel pair of the image display source on the head-mounted device, wherein the line-of-sight tracking system is for capturing line-of-sight information data in eye-centered coordinate while a user stares at a target object;

the data processing module is for obtaining coordinates of the left and the right pixel pair of the target object according to η and the line-of-sight information data in eye-centered coordinate of the target object;

the image display source is for displaying an information source image of virtual information to be displayed on left and right respectively, wherein the coordinates of the left and the right pixel pair of the target object is a reference position.

Optimally, the image display source is for:

displaying the information source image of the virtual information to be displayed on the left and the right of the image display source respectively, wherein the coordinates of the left and the right pixel pair of the target object is a center; or displaying the information source image of the virtual information to be displayed on the left and the right of the image display source respectively, which is at a shifted position of the coordinates of the left and the right pixel pair of the target object.

Optimally, the head-mounted display device comprises an adapter module which is for modifying η when the user initially use the head-mounted device and/or while each use of the head-mounted device.

Optimally, the adapter module is for:

controlling the image display source to display each pixel pair in a left and a right modified bitmap in sequence to project a virtual bitmap corresponding to each pixel pair in front of the user eyes;

controlling the line-of-sight tracking system to capture the line-of-sight information data in eye-centered coordinate when the user stares at each virtual bitmap to obtain the line-of-sight information data in eye-centered coordinate corresponding to the virtual bitmap;

controlling the data processing module to modify η by using the line-of-sight information data in eye-centered coordinate corresponding to all the virtual bitmaps.

Optimally, the left and the right modified bitmap is a bitmap with r rows and s columns, wherein the r and s are positive integers which are greater than 1 and less than 10.

Optimally, the adapter module is for:

controlling the image display source to display each pixel pair in a left and a right modified bitmap in sequence to project a virtual bitmap corresponding to each pixel pair in front of the user eyes;

controlling the line-of-sight tracking system to capture the line-of-sight information data in eye-centered coordinate when the user stares at each virtual bitmap to obtain the line-of-sight information data in eye-centered coordinate corresponding to the virtual bitmap;

controlling the data processing module to modify η by using the line-of-sight information data in eye-centered coordinate corresponding to all the virtual bitmaps.

Optimally, η fulfills:

$$(ELnm_1, ERnm_2) \Leftrightarrow f(SLnm_1, SRnm_2);$$

wherein $(ELnm_1, ERnm_2)$ is the line-of-sight information data in eye-centered coordinate; $(SLnm_1, SRnm_2)$ are coordinates of the left and the right pixel pair of the image display source on the head-mounted device; wherein $n \in [1, N]$, $m_1 \in [1, M]$ $m_2 \in [1, M]$; N and M are a vertical resolution and a horizontal resolution of a left and a right image display source on the head-mounted device respectively; $f$ is a fitting function.

The present invention tracks the user eyes space line-of-sight information data through the line-of-sight tracking system and displays the virtual information to be displayed on the human eyes line of sight path on the left and the right respectively according to the binocular see-through AR head-mounted device virtual image imaging theory and the human eyes binocular vision theory to accurately overlap the virtual information near the human eyes stare point and fuse the virtual information with the surrounding environment at a high degree, which truly realizes the augmented virtual reality. The solution of the present invention is simple, which is adding a line-of-sight tracking system on the head-mounted device. The present invention doesn't require extra hardware and is low cost. The conventional method for adjusting the depth of field is by changing the image distance of the optical components. The present invention breaks the limitation and adjusts the depth of field by adjusting the display position of the left and the right sets of effective display information on the image display source. The present invention is innovative and practical in use compared with the method of changing the optical focal length.

BRIEF DESCRIPTION OF THE DRAWINGS

In order to better explain the embodiments of the present invention or the solution of the conventional technology, a brief introduction of the drawings which illustrate the embodiments or the conventional technology is as follow. Obviously, the drawings described below are just for several embodiments of the present invention. The skilled technicians in the field are able to develop other drawings based on the drawings without any innovative effort.

DETAILED DESCRIPTION OF THE PREFERRED EMBODIMENT

Figure 1:
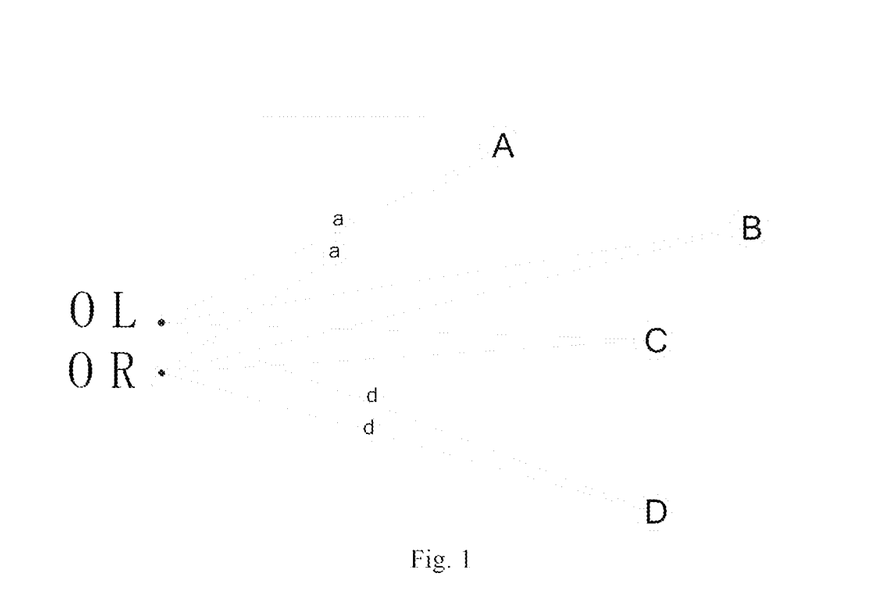
FIG. 1 is a perspective view of a human eyes space line-of-sight path.
Figure 2:
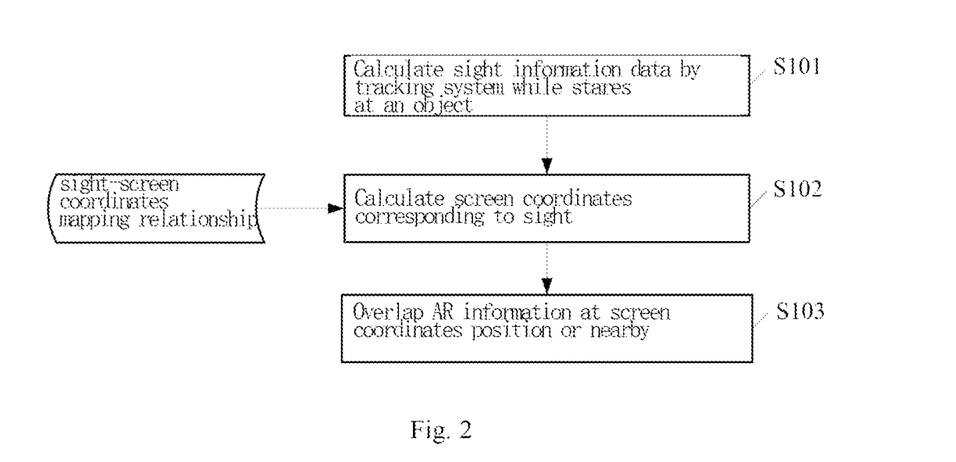
FIG. 2 is a flow chart of an information display method of a binocular see-through AR head-mounted device in the embodiment of the present invention.
Figure 3:
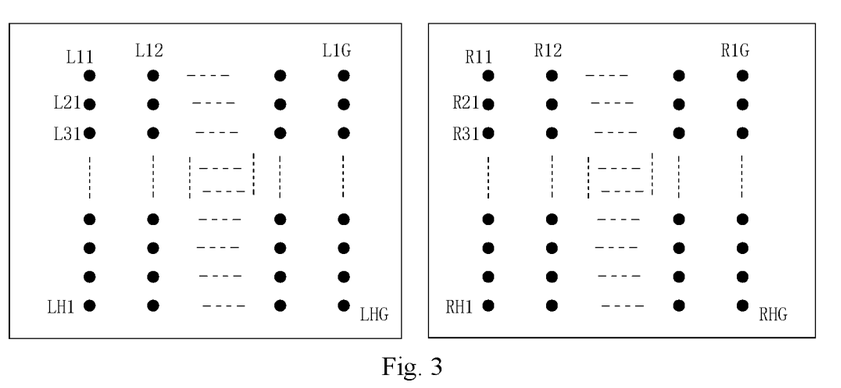
FIG. 3 is a perspective view of a bitmap which calibrates the line-of-sight mapping relationship η.

Referring to FIGS. 1 to 3 of the drawings, the technical solution of the embodiment of the present invention is described clearly and completely. Obviously, the described embodiment is just a part of the embodiments of the present invention. All the embodiments developed based on the embodiment of the present invention by the skilled technician in the field without any innovative effort are within the protection range of the present invention.

The applicant has noticed that the viewing angles of the left and the right eye are different when the user stares at the target object at different positions. Referring to FIG. 1, A/B/C/D denotes target object at different position in the space. While people stares at the target object A, the directions of the line-of-sight of the left and the right eye are space vectors OLA and ORA respectively. In the AR (augmented reality) head-mounted device field, the left and the right eye of the user observe a left and a right virtual image respectively through the binocular head-mounted device. When the line-of-sight of the left eye staring at the left virtual image converges with the line-of-sight of the right eye staring at the right virtual image in the space, an overlapped virtual image at a distance from the user is observed. The distance from the virtual image to the human eyes is decided by the space viewing vector (line-of-sight) composed of the left and the right virtual image with the left and the right eye respectively.

As shown in FIG. 1, the user observes the virtual image a through the binocular see-through AR head-mounted device. When the left and the right line-of-sight space vector of the left eye observing the left virtual image a and the right eye observing the right virtual image comply with the space vector OLA and ORA respectively, the user will observe an overlapped virtual image formed by the left and the right image through the head-mounted device. The overlapped virtual image a has identical space position with the target object A. Based on the theory, the present invention realizes a real-time virtual image overlap in any space position and truly realizes the augmented virtual reality.

The present invention adopts a line-of-sight tracking system which is briefly described as below.

The line-of-sight tracking technology is to capture the user current "viewing direction" by using electronic/optical test means and to collect the line-of-sight changing parameters among the position changing features and the unchanging features of the eye structure the relative position of which is not change while the eyeballs rotates and the unchanging features are a reference. Then obtaining the line-of-sight through geometry model or mapping model. The collected features are categorized in 3 groups: 1) vectors of the center of the pupils and the corneal reflex; 2) corneal reflex matrix; 3) the oval border of the iris. The video-oculography (VOG) based on the eye video analysis generally adopts the pupil-corneal reflex method which captures the direction of the line-of-sight by tracking the relative position of the pupil center and the corneal reflex. The corneal reflex is a virtual image formed by reflection of the light source (commonly adopts near infrared light source) on the surface of the corneal and the camera captures the virtual image formed in real pupil after refraction by the corneal. The line-of-sight tracking system based on the pupil-corneal reflex comprises a near infrared light source (850 nm), infrared camera, image capture card and data processing CPU. The image in the eyes captured by the charged couple device (CCD) is transported to the computer and is processed; the information of the position of the pupil center and facula is collected; analyzing the facial image with the digital image processing method and collecting the view direction parameter of the plane; transforming the plane information with the established mathematic model to the line-of-sight information data in eye-centered coordinate; the line-of-sight information data in eye-centered coordinate comprises the rotating angle of the line-of-sight.

Referring to the drawings the detailed technical solution of the embodiment of the present invention is as follow.

FIG. 2 illustrates the flow chart of the information display method of the binocular see-through AR head-mounted device of the embodiment. The line-of-sight mapping relationship η needs to be preset inside the head-mounted device in the embodiment. η is the line-of-sight mapping relationship between the line-of-sight information data in eye-centered coordinate and the coordinates of the left and the right pixel pair of the image display source on the head-mounted device (η is also described as line-of-sight-screen coordinate mapping relationship). The information display method of the embodiment comprises the steps of S101 to S103.

Step S101: recording the line-of-sight information data in eye-centered coordinate while the user stares at a target object by the line-of-sight tracking system, wherein when the user observes the surrounding through the head-mounted device, the line-of-sight tracking system tracks the change in line-of-sight eyeball of the user in real time. When the user stares at a target object, the line-of-sight tracking system calculates the user line-of-sight information data in eye-centered coordinate and transfers the information data to the data processing module.

Step S102: calculating the plane coordinate corresponding to the line-of-sight, wherein the data processing module captures the coordinates position data (screen coordinate) of the image display source pixel pair corresponding to the line-of-sight information data in eye-centered coordinate and the line-of-sight mapping relationship η.

Step S103: Overlapping the AR information at the screen coordinate position or adjacent area with the image, comprising steps of displaying the information source image of the virtual information to be displayed on the left and right part of the image display source respectively, wherein the corresponding image display source pixel pair is the reference position, wherein the corresponding pixel pair being the reference position refers to displaying the information source image of the virtual information to be displayed on the left and right part of the image display source respectively, wherein the coordinates of the corresponding pixel pair is the center position, so that the user is able to view the virtual information at the target object position through the head-mounted device. Or the corresponding pixel pair being the reference position refers to displaying the information source image of the virtual information to be displayed on the left and right part of the image display source respectively at the offset position of the coordinates of the corresponding pixel pair, so that the user is able to view the virtual information beside the target object through the head-mounted device. Setting a shifted position is to display the virtual information beside the target object and not to cover the target object, which is in line with the habit of the user. The information source image of the left and the right virtual information has to offset synchronously, which means the center to center distance and the relative position of the left and the right information source image keep unchanged. The display position of the information source image on the image display source is changed.

The line-of-sight mapping relationship η preset inside the head-mounted device is able to be calculated by offline calibration test. The mapping relationship η is tested and stored inside the head-mounted device before delivery. The line-of-sight mapping relationship η is relevant to the structure of the head-mounted device. The line-of-sight mapping relationship η is settled after the structure of the head-mounted device is fixed. For different users, the wearing deviation needs to be modified by the modification coefficient. In order to fully explain the present invention, a calibration method for the line-of-sight mapping relationship η is illustrated with an example which is just for example not a limitation for other calibration methods.

Calculating the line-of-sight mapping relationship η comprises steps of:

collecting data of Q test users by the line-of-sight tracking system, wherein each user observes K sets of bitmap respectively to calibrates the line-of-sight mapping relationship η; Q is a positive integer not less than 1; assuming the left and right part of the image display source of the head-mounted device both has pixel bitmap N*M, that is the horizontal resolution is M and the vertical resolution is N.

each test user observing K sets of bitmap comprises steps of A to C:

Step A: displaying two identical H*G bitmap on the left and right part of the image display source on the head-mounted device; as shown in FIG. 3 the center to center distance of the two sets of bitmaps is p1 and the distance between the main optical axes of the two sets of optical system on the head-mounted device is P, wherein p1<=P, G<=M, H<=N, G; the value of the G is more approaching M the value of H is more approaching N and the test result is more accurate; big G and H value requires too many test points which induce dizzy and asthenopia for the user, so appropriate values need to be assigned to G and H according to different situations;

Step B: displaying each pixel pair in the left and the right bitmap by the image display source in sequence while test the test users, wherein (L11, R11), (L21, R21), (L31, R31), . . . (LHG$_1$, RHG$_2$); displaying one pair of the pixel a time (Lhg$_1$, Rhg$_2$), wherein h∈[1,H], g$_1$∈[1,G], g$_2$∈[1,G]; the test user stares at the virtual bitmap projected in front of the human eyes through the head-mounted device; recording the line-of-sight information data in eye-centered coordinate while the user stares at each virtual bitmap by the line-of-sight tracking system to obtain a set of data; setting the coordinates position of a pair of the left and right bitmap on the image display source of the head-mounted device as (SLxhg$_1$,SLyhg$_2$), (SRxhg$_1$,SRyhg$_2$), wherein h∈[1,H], g$_1$∈[1,G], g$_2$∈[1,G]; displaying each pixel pair on the image display source in sequence; recording the line-of-sight space coordinates of the left and right eyeballs while the user stares at the virtual enlarged and overlapped bitmaps corresponding to each pixel pair (SLxhg$_1$,SLyhg$_2$), (SRxhg$_1$,SRyhg$_2$) through the window on head-mounted device by line-of-sight tracking system; denoting the coordinates as (ELxhg$_1$, ELyhg$_2$), (ERxhg$_1$, ERyhg$_2$); thus obtaining the coordinates of H*G sets of bitmaps on the image display source and the corresponding left and right eyes space line-of-sight information data; for convenient purpose, denotes the pixel pair on the display screen as (SLhg$_1$,SRhg$_2$), wherein the corresponding line-of-sight information data in eye-centered coordinate is denoted as (ELhg$_1$,ERhg$_2$);

obtaining a set of mapping relationship between the coordinates of each pixel pair on the image display source and the line-of-sight information data in eye-centered coordinate:

$$(ELhg_1, ERhg_2) \Leftrightarrow f(SLhg_1, SRhg_2)$$

wherein, h∈[1,H], g$_1$∈[1,G], g$_2$∈[1,G]; H and G are the vertical resolution and the horizontal resolution of the left and the right bitmap respectively; $f$ is the fitting function;

Step C: reducing the center to center distance d1 of the left and the right bitmap displayed on the image display source according to certain rules (such as reducing d1 in same step in sequence, or reducing d1 according to the exponential function etc.); For example, reducing i pixel symmetrically in sequence; repeating the step B after each reduction of d1; obtaining K set of data after K operation; each data is the mapping relationship between the coordinates of the pixel pair on the image display source and the line-of-sight information data in eye-centered coordinate:

$$(ELhg_1, ERhg_2)_1 \Leftrightarrow (SLhg_1, SRhg_2)_1$$
$$(ELhg_1, ERhg_2)_2 \Leftrightarrow (SLhg_1, SRhg_2)_2$$
$$\vdots$$
$$(ELhg_1, ERhg_2)_K \Leftrightarrow (SLhg_1, SRhg_2)_K$$

Obtaining the line-of-sight information data in eye-centered coordinate corresponding to the coordinates of H*G pairs of pixel pair on the display screen in each test; after K test on the user, the line-of-sight information data in eye-centered coordinate corresponding to the K*H*G pairs of pixel pair on the display screen is obtained; fitting the K*H*G sets of data to calculate fitting curve function f of the coordinates of the left and right pixel pair on the display screen and the line-of-sight information data in eye-centered coordinate; substituting the coordinate data into the fitting curve function f to calculate the corresponding line-of-sight information data in eye-centered coordinate based on the calculated fitting curve function f and the existing coordinate data of the left and right pixel pair on the display screen; the pixel of the left and right display screen is N*M and the pixel pair is N*(M*N).

$$\begin{cases} f(SL1m_1, SR1m_2) \Leftrightarrow (EL1m_1, ER1m_2) \\ f(SL2m_1, SR2m_2) \Leftrightarrow (EL2m_1, ER2m_2) \\ f(SL3m_1, SR3m_2) \Leftrightarrow (EL3m_1, ER3m_2) \\ \vdots \\ \vdots \\ f(SLNm_1, SRNm_2) \Leftrightarrow (ELNm_1, ERNm_2) \end{cases}$$

A variable n is introduced, wherein n∈[1,N] and the formula is simplified as below:

$$f(SLnm_1, SRnm_2) \Leftrightarrow (ELnm_1, ERnm_2)$$

wherein n∈[1,N], $m_1$∈[1,M], $m_2$∈[1,M]; N and M are the vertical resolution and horizontal resolution of the left and the right part of the image display source respectively; $f$ is the fitting function.

When Q=1, that is just one test user, the mapping relationship η is as follow:

$$f(SLnm_1, SRnm_2) \Leftrightarrow (ELnm_1, ERnm_2)$$

If Q≠1, test the Q test user to obtain Q sets of mapping relationship:

$$\begin{aligned} \{f(SLnm_1, SRnm_2)\}_1 &\Leftrightarrow (ELnm_1, ERnm_2)_1 \\ \{f(SLnm_1, SRnm_2)\}_2 &\Leftrightarrow (ELnm_1, ERnm_2)_2 \\ &\vdots \\ &\vdots \\ \{f(SLnm_1, SRnm_2)\}_Q &\Leftrightarrow (ELnm_1, ERnm_2)_Q \end{aligned}$$

Interpolating the fitting of the Q sets of data to obtain the mapping relationship η between the coordinates of the left and the right pixel pair on the screen and the line-of-sight information data in eye-centered coordinate:

$$(ELnm_1, ERnm_2) \Leftrightarrow f(SLnm_1, SRnm_2, t)$$

wherein t is the correction factor of the Q sets of data fitting.

Testing the Q test users to obtain Q*(K*H*G) sets of data on the screen pixel pairs and the line-of-sight information data in eye-centered coordinate; obtaining the calculated line-of-sight information data in eye-centered coordinate corresponding to each pair of modified pixels according to the line-of-sight mapping relationship η; comparing the calculated line-of-sight information data in eye-centered coordinate with the recorded test data to calculate a compensating factor t for minimizing the root-mean-square error of the calculated data and the test data; the compensating factor is also the correction factor of the mapping relationship η.

In the function expression, t is able to be merged into the function; denoting the fitting function merged with the correction factor t as $f_1$ and the mapping relationship η is further expressed as:

$$(ELnm_1, ERnm_2) \Leftrightarrow f_1(SLnm_1, SRnm_2).$$

Due to the differences in the users' line-of-sight, when the user initially uses the head-mounted device, a simple calibration on the line-of-sight is needed for better results; similar calibration method for the mapping relationship η is adopted for the initial simple calibration to correct the line-of-sight mapping relationship η until the mapping relationship is appropriate for the user. During each use, the wearing position is slightly different which requires correction for the line-of-sight mapping relationship η in the same way. The correction mapping relationship η is expressed as:

$$f(ELnm_1, ERnm_2, w) \Leftrightarrow (ELnm_1, ERnm_2)$$

wherein w is the correction factor.

The method of correcting the mapping relationship η to suit the user comprises steps of: displaying multiple sets of modified images on the left and right part respectively by the image display source while the user initially uses the head-mounted device; the user staring at the overlapped virtual image in front of the human eyes through the head-mounted devices; calculating the line-of-sight information data in eye-centered coordinate while the user stares at each overlapped virtual image in sequence by the line-of-sight tracking system; correcting the line-of-sight mapping relationship η to suit the user according to the user data by the data processing module; the modified data is designed as a graph or bitmap; for bitmap, displaying each pixel pair in the left and right modified bitmaps by the image display source; the user staring at the virtual bitmap projected in front of the eyes; recording the line-of-sight information data in eye-centered coordinate while the user stares at each virtual bitmap by the line-of-sight tracking system in sequence; obtaining a set of data of the user; correcting the line-of-sight mapping relationship η to suit the user according to the user data by the data processing module.

Obtaining a set of coordinates of the pixel pair of the modified image on the display screen recorded by the system while the calibration test for the device while the initial use by the user and the corresponding line-of-sight information data in eye-centered coordinate of the user. The modified bitmap is a bitmap with r rows and s columns, wherein r and s are positive integers bigger than 1 and less than 10; such as a 5*5 bitmap.

$$f(SLrs_1, SRrs_2) \Leftrightarrow (ELrs_1, ERrs_2)$$

wherein r∈[1,R], $s_1$∈[1,S], $s_2$∈[1,S]; R and S are the vertical resolution and the horizontal resolution of the modified bitmap respectively; $f$ is the fitting function.

Based on the line-of-sight mapping relationship η, obtaining the calculated line-of-sight information data in eye-centered coordinate $(ELrs_1, ERrs_2)_{CAC}$ corresponding to each modified pixel pair $(SLrs_1, SRrs_2)$; comparing the calculated line-of-sight information data in eye-centered coordinate with the recorded test data $(SLrs_1, SRrs_2)$ to calculate a compensating coefficient w to minimize the root-mean-square error of the calculated data and the test data, wherein the compensating coefficient is the correction factor of the mapping relationship η.

The wearing position is slightly different while each use of the head-mounted device, so a correction for η is needed. Similar correction method as for the initial correction is adopted. More pixels of the correction bitmap are able to be displayed while initial use, such as 12. Four correction pixels are displayed to reduce error caused by different wearing position while each use by the user after the initial use. The modified mapping relationship η is expressed as:

$$f(SLrs_1, SRrs_2, w) \Leftrightarrow (ELrs_1, ERrs_2)$$

wherein w is the correction factor.

The information display method of the binocular see-through AR head-mounted device in the embodiment of the present invention has been described. The binocular see-through AR head-mounted display device corresponding to the method is listed below. Details which have already been described in the method will not be described in the below introductions on the binocular see-through AR head-mounted device.

A binocular see-through AR head-mounted display device in the embodiment of the present invention comprises a optical system, an image display source, a line-of-sight tracking system and a data processing module, wherein the data processing module stores a line-of-sight mapping relationship η; η is a mapping relationship between line-of-sight information data in eye-centered coordinate and coordinates of a left and a right pixel pair of the image display source on the head-mounted device; wherein the optical system comprises one or several lens through which the user is able to view the virtual information displayed on the image display source and the real surroundings outside. The line-of-sight tracking system is for a real-time capture of the change in the line-of-sight of the eyeballs of the user. The line-of-sight tracking system records the line-of-sight information data in eye-centered coordinate while a user stares at a target object and transfers the information data to the data processing module. The data processing module is for obtaining the corresponding coordinates position data of the pixel pair of the image display source according to the transferred line-of-sight information data in eye-centered coordinate and the line-of-sight mapping relationship η. The data processing module controls the image display source to display the information source image of the virtual information to be displayed on the image display source on the left and right part, wherein the coordinates of the corresponding pixel pair is a reference position; the corresponding pixel pair being the reference position refers to displaying the information source image of the virtual information to be displayed on the left and right part of the image display source respectively wherein the coordinates of the corresponding pixel pair is the center position, so that the user is able to view the virtual information at the target object position through the head-mounted device. Or the corresponding pixel pair being the reference position refers to displaying the information source image of the virtual information to be displayed on the left and right part of the image display source respectively at the offset position of the coordinates of the corresponding pixel pair, so that the user is able to view the virtual information beside the target object through the head-mounted device. Setting a shifted position is to display the virtual information beside the target object and not to cover the target object, which is in line with the habit of the user.

The line-of-sight mapping relationship η stored in the data processing module is able to be the below corresponding relation calculated according to the calibration method:

$$(ELnm_1, ERnm_2) \Leftrightarrow \theta(SLnm_1, SRnm_2)$$

wherein $(ELnm_1, ERnm_2)$ is the line-of-sight information data in eye-centered coordinate; $(SLnm_1, SRnm_2)$ is the coordinates of the left and the right pixel pairs of the image display source on the head-mounted device, wherein n∈[1, N], $m_1$∈[1,M], $m_2$∈[1,M]; N and M are the vertical resolution and the horizontal resolution of the left and the right part of the image display source on the head-mounted device respectively; $f$ is the fitting function.

The head-mounted device comprises the adapter module which is for controlling the image display source to display multiple sets of modified image in a left and right part in sequence before initial use and/or each use of the head-mounted device, wherein the user stares at an overlapped virtual bitmap projected in front of the user through the head-mounted device; controlling the line-of-sight tracking system to capture the line-of-sight information data in eye-centered coordinate when the user stares at each virtual bitmap to obtain a set of data of the user; controlling the data processing module to modify the line-of-sight mapping relationship η according to the user data to suit the user; a correction factor is obtained and stored inside the adapter module. The detailed solution has been introduced and no need for repeat.

The display screen is formed by crystal lattice and the image is formed by pixels. The position coordinates of the neighboring pixels corresponding to the eyeball status coordinates is not able to match the pixel pair on the image source. When the coordinates of the image source pixel pair corresponding to the eyeball status coordinates data calculated by the line-of-sight tracking system lies in between two pixels, the coordinates of the image source pixel pair is denoted with the most approaching pixel pair, which causes error. In order to solve the problem, the image display source in the present invention optimally select two high resolution micro-display such as a OLED (organic light-emitting diode) micro-display which is sized in 0.61 inches and with a resolution of 1920*1200. The diagonal size of every pixel pair reaches 6.8 um. If the image display source adopts two small and middle sized display, such as 2 inches or 3.5 inches, the size of each pixel is about several tens um due to the production craft. The method of physical micro motion, which is machine translation, of the display is adopted to reduce the error.

The present invention tracks and calculates the user eye space line-of-sight information data with the line-of-sight tracking system. The present invention displays the virtual information need display on the human eyes line of sight path on the left and the right respectively according to the binocular see-through AR head-mounted device virtual image imaging theory and the human eyes binocular vision theory to accurately overlap the virtual information near the human eyes stare point and fuse the virtual information with the surrounding environment at a high degree, which truly realizes the augmented virtual reality. The solution of the present invention is simple, which is adding a line-of-sight tracking system on the head-mounted device. The present invention doesn't require extra hardware and is low cost.

All the features, methods and steps of the methods disclosed in the present invention are able to be combined arbitrarily except the conflicted features and/or steps.

All the features (including the claims, abstract and drawings) disclosed in the present invention are able to be substituted with features of similar purpose and effects. Each feature is just an example of a series of similar or equivalent features unless explained otherwise.

The present invention is not limited by the embodiment. The present invention covers all the new features or new combinations disclosed in the specification and any new combination of the new methods and steps of the method.

What is claimed is:

1. An information displaying method of a binocular see-through augmented reality (AR) head-mounted device, wherein a sight mapping relationship η is preset in the head-mounted device; η is the mapping relationship between line-of-sight information data in eye-centered coordinate and coordinates of a left and a right pixel pair of an image display source of the head-mounted device; the information displaying method comprises steps of:

capturing the line-of-sight information data in eye-centered coordinate when a user stares at a target object;

calculating the coordinates of the left and right pixel pair of the target object according to η and the line-of-sight information data in eye-centered coordinate of the target object; and displaying an information source image of virtual information to be displayed onto an image display source on left and right respectively, wherein the coordinates of the left and right pixel pair of the target object is a reference position:

wherein η fulfils:

$$(ELnm_1, ERnm_2) \Leftrightarrow f(SLnm_1, SRnm_2);$$

wherein $(ELnm_1, ERnm_2)$ is the line-of-sight information data in eye-centered coordinate; $(SLnm_1, SRnm_2)$ are the coordinates of the left and the right pixel pair of the image display source on the head-mounted device, wherein $f$ is a fitting function.

2. The method, as recited in claim 1, wherein displaying the information source image of virtual information to be displayed onto the image display source on the left and the right respectively, wherein the coordinates of the left and the right pixel pair of the target object is a reference position, comprises steps of:

displaying the information source image of virtual information to be displayed onto the image display source on left and right respectively, wherein the coordinates of the left and right pixel pair of the target object is a center; or displaying the information source image of virtual information to be displayed onto the image display source on left and right respectively, which is at a shifted position of the coordinates of the left and right pixel pair of the target object.

3. The method, as recited in claim 2, further comprising a step of: when the user initially uses the head-mounted device or while each use of the head-mounted device, modifying η.

4. The method, as recited in claim 3, wherein modification method of η comprises steps of:

controlling the image display source to display each pixel pair of a left and a right modified bitmap in sequence to project a virtual bitmap corresponding to each pixel pair in front of the user eyes;

capturing the line-of-sight information data in eye-centered coordinate while the user stares at every virtual bitmap to calculate the line-of-sight information data in eye-centered coordinate corresponding to the virtual bitmap; and modifying η by using the line-of-sight information data in eye-centered coordinate corresponding to all the virtual bitmap.

5. The method, as recited in claim 4, wherein the left and the right modified bitmap is a bitmap with r rows and s columns, wherein r and s are positive integers which are greater than 1 and less than 10.

6. The method, as recited in claim 3, wherein the modification of η comprises steps of:

controlling the image display source to display multiple sets of a left and a right modified image in sequence to project a virtual overlap image corresponding to every set of the modified image in front of the user eyes;

capturing line-of-sight information data in eye-centered coordinate while the user stares at every virtual overlap image to obtain the line-of-sight information data in eye-centered coordinate corresponding to the virtual overlap image; and modifying η by using the line-of-sight information data in eye-centered coordinate corresponding to all of the virtual overlap images.

7. The method, as recited in claim 1 wherein an offline constructing method of η comprises steps of:

capturing multiple sets of the left and the right bitmaps;

testing a test user in multiple test users by using all the left and right bitmaps in sequence to obtain test data of the test user; and constructing η according to the test data of all the test users;

wherein, testing the test user by using all the left and the right bitmap to calculate the test data of the test user comprises steps of:

controlling the image display source to display each pixel pair of the left and the right bitmap in sequence for each set of the left and the right bitmap of the multiple sets of the left and the right bitmaps in sequence to project the virtual bitmap corresponding to the coordinates of the pixel pair in front of the test user eyes;

capturing the line-of-sight information data in eye-centered coordinate while the user stares at the virtual bitmap to obtain the line-of-sight information data in eye-centered coordinate corresponding to the pixel pair; and determining the test data of the test user and building a mapping relationship between the test data comprising the coordinates of each pixel pair of all the left and the right bitmap and the corresponding line-of-sight information data in eye-centered coordinate.

8. The method, as recited in claim 2, wherein an offline constructing method of η comprises steps of:

capturing multiple sets of the left and the right bitmaps;

testing a test user in multiple test users by using all the left and right bitmaps in sequence to obtain test data of the test user; and constructing η according to the test data of all the test users;

wherein, testing the test user by using all the left and the right bitmap to calculate the test data of the test user comprises steps of:

controlling the image display source to display each pixel pair of the left and the right bitmap in sequence for each set of the left and the right bitmap of the multiple sets of the left and the right bitmaps in sequence to project the virtual bitmap corresponding to the coordinates of the pixel pair in front of the test user eyes;

capturing the line-of-sight information data in eye-centered coordinate while the user stares at the virtual bitmap to obtain the line-of-sight information data in eye-centered coordinate corresponding to the pixel pair; and determining the test data of the test user and building a mapping relationship between the test data comprising the coordinates of each pixel pair of all the left and the right bitmap and the corresponding line-of-sight information data in eye-centered coordinate.

9. The method, as recited in claim 7, wherein capturing the multiple sets of the left and the right bitmaps comprise steps of:

capturing an initial left and right bitmap; and obtaining the multiple sets of the left and the right bitmaps according to the initial left and right bitmap and shorten a center to center distance of the calculated multiple sets of the left and the right bitmaps in sequence.

10. The method, as recited in claim 1, wherein $n \in [1, N]$, $m_1 \in [1, M]$, $m_2 \in [1, M]$; N and M are a vertical resolution and a horizontal resolution of a left and a right image display source of the head-mounted device respectively.

11. The method, as recited in claim 2, wherein $n \in [1,N] m_1 \in [1,M], m_2 \in [1,M]$; N and M are a vertical resolution and a horizontal resolution of a left and a right image display source of the head-mounted device respectively.

12. The method, as recited in claim 5, wherein $n \in [1,N]$, $m_1 \in [1,M]$, $m_2 \in [1,M]$; N and M are a vertical resolution and a horizontal resolution of a left and a right image display source of the head-mounted device respectively.

13. The method, as recited in claim 6, wherein $n \in [1,N]$, $m_1 \in [1,M]$, $m_2 \in 1,M]$; N and M are a vertical resolution and a horizontal resolution of a left and a right image display source of the head-mounted device respectively.

14. A binocular see-through augmented reality (AR) head-mounted display device comprises an image display source, a line-of-sight tracking system and a data processing module, wherein the data processing module stores a line-of-sight mapping relationship $\eta$; $\eta$ is a mapping relationship between line-of-sight information data in eye-centered coordinate and coordinates of a left and a right pixel pair of the image display source on the head-mounted device, wherein
  the line-of-sight tracking system is for capturing line-of-sight information data in eye-centered coordinate while a user stares at a target object;
  the data processing module is for obtaining coordinates of the left and the right pixel pair of the target object according to $\eta$ and the line-of-sight information data in eye-centered coordinate of the target object;
  the image display source is for displaying an information source image of virtual information to be displayed on left and right respectively, wherein the coordinates of the left and the right pixel pair of the target object is a reference position:
  wherein $\eta$ fulfils:

$$(ELnm_1, ERnm_2) \lesssim f(SLnm_1, SRnm_2);$$

wherein $(ELnm_1, ERnm_2)$ is the line-of-sight information data in eye-centered coordinate; $(SLnm_1, SRnm_2)$ are the coordinates of the left and the right pixel pair of the image display source on the head-mounted device, wherein $f$ is a fitting function.

15. The head-mounted display device, as recited in claim 14, wherein the image display source is for:
  displaying the information source image of the virtual information to be displayed on the left and the right of the image display source respectively, wherein the coordinates of the left and the right pixel pair of the target object as a center; or
  displaying the information source image of the virtual information to be displayed on the left and the right of the image display source respectively, which is at a shifted position of the coordinates of the left and the right pixel pair of the target object.

16. The head-mounted display device, as recited in claim 15, further comprising an adapter module which is for modifying $\eta$ when the user initially use the head-mounted device or while each use of the head-mounted device.

17. The head-mounted display device, as recited in claim 16, wherein the adapter module is for:
  controlling the image display source to display each pixel pair in a left and a right modified bitmap in sequence to project a virtual bitmap corresponding to each pixel pair in front of the user eyes;
  controlling the line-of-sight tracking system to capture the line-of-sight information data in eye-centered coordinate when the user stares at each virtual bitmap to obtain the line-of-sight information data in eye-centered coordinate corresponding to the virtual bitmap;
  controlling the data processing module to modify $\eta$ by using the line-of-sight information data in eye-centered coordinate corresponding to all the virtual bitmaps.

18. The head-mounted display device, as recited in claim 17, wherein the left and the right modified bitmap is a bitmap with r rows and s columns, wherein the r and s are positive integers which are greater than 1 and less than 10.

19. The head-mounted display device, as recited in claim 16, wherein the adapter module is for:
  controlling the image display source to display multiple sets of modified images on the left and the right in sequence to project a virtual overlapped image corresponding to each set of the modified image in front of the user eyes;
  controlling the line-of-sight tracking system to capture the line-of-sight information data in eye-centered coordinate while the user stares at each virtual overlapped image to obtain line-of-sight information data in eye-centered coordinate corresponding to the virtual overlapped image;
  controlling the data processing module to modify $\eta$ by using the human space line-of-sight information data corresponding to all the virtual overlapped image.

20. The head-mounted device, as recited in claim 14, wherein: $n \in [1,N]$, $m_1 \in [1,M]$, $m_2 \in 1,M]$; N and M are a vertical resolution and a horizontal resolution of a left and a right image display source on the head-mounted device respectively.

* * * * *